United States Patent [19]

O'Sullivan et al.

[11] Patent Number: 4,893,961
[45] Date of Patent: Jan. 16, 1990

[54] JOIST HANGER

[75] Inventors: Kevin B. O'Sullivan; Arthur L. Troutner, both of Boise, Id.

[73] Assignee: Trus Joist Corporation, Boise, Id.

[21] Appl. No.: 361,591

[22] Filed: Jun. 5, 1989

[51] Int. Cl.⁴ ............................ F16L 3/00; E04C 7/00
[52] U.S. Cl. .................................. 403/232.1; 403/187; 403/231; 403/403; 52/289; 52/702; 52/715; 52/729
[58] Field of Search ...................... 403/232.1, 187, 403, 403/231; 52/289, 702, 715, 665, 729, 126.1

[56] References Cited

U.S. PATENT DOCUMENTS

| 537,505 | 4/1895 | Van Dorn . | |
|---|---|---|---|
| 666,918 | 1/1901 | Butz . | |
| 770,050 | 9/1904 | Dreyer | 403/232.1 X |
| 796,433 | 8/1905 | Kahn | 403/232.1 X |
| 1,658,130 | 2/1928 | Lally . | |
| 2,037,736 | 4/1936 | Payne et al. | 403/406.1 X |
| 3,184,800 | 5/1965 | Nelson | 403/217 X |
| 3,481,635 | 12/1969 | Tracy | 403/217 X |
| 3,596,941 | 8/1971 | Tracy | 403/232.1 |
| 3,907,445 | 9/1975 | Wendt | 403/232 |
| 3,972,169 | 8/1976 | Sheppard, Jr. | 52/702 |
| 3,989,398 | 11/1976 | Wendt | 403/232 |
| 4,198,175 | 4/1980 | Knepp et al. | 403/191 |
| 4,230,416 | 10/1980 | Gilb | 403/232.1 |
| 4,411,548 | 10/1983 | Tschan | 403/232.1 |
| 4,423,977 | 1/1984 | Gilb | 403/232.1 |
| 4,498,801 | 2/1985 | Gilb | 403/232.1 |
| 4,560,301 | 12/1985 | Gilb | 403/232.1 |
| 4,637,194 | 1/1987 | Knowles | 52/729 X |

FOREIGN PATENT DOCUMENTS 422765  1/1935  United Kingdom ............. 403/232.1

OTHER PUBLICATIONS

Teco Publication, "The Standard of Excellence in Structural Wood Fasteners" (No. 110, 1987).
Popular Mechanics, Aug. 1964, pp. 137–140, "Engineered Nailing Simplifies Framing".

Primary Examiner—Randolph A. Reese
Assistant Examiner—Franco Deliguori
Attorney, Agent, or Firm—Kolisch, Hartwell & Dickinson

[57] ABSTRACT

A glued-block hanger is intended to support a wooden I-beam joist on a support. A block is secured to the web of the I-beam joist at an end thereof intermediate the top and bottom chords. A bore is formed in the block and end, and extend therethrough at a predetermined position. The hanger includes a top tab and an end plate, wherein the end plate extends the height of the hanger. The top tab is constructed to extend over the top of a support. A pair of opposed flanges extend outward from the end plate and are spaced apart to snugly receive the web of the joist, with the block secured thereto, therein. Each of the flanges includes an opening therein. When the opening is aligned with the bore, the top tab of the hanger is in alignment with the top chord of the joist. A connector extends through the bore and the openings to fasten the joist to the hanger.

20 Claims, 3 Drawing Sheets

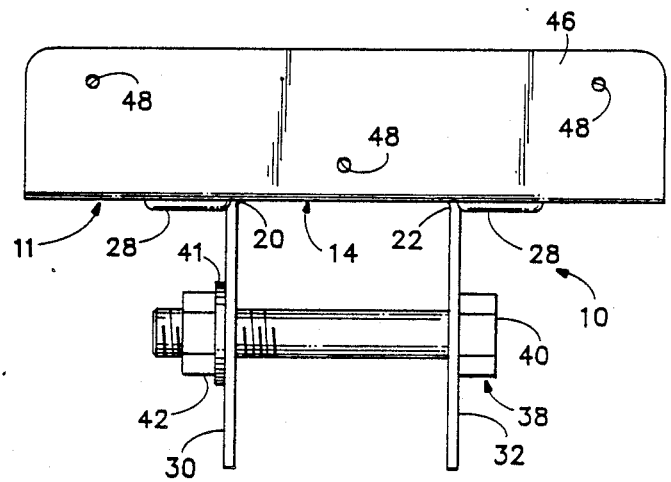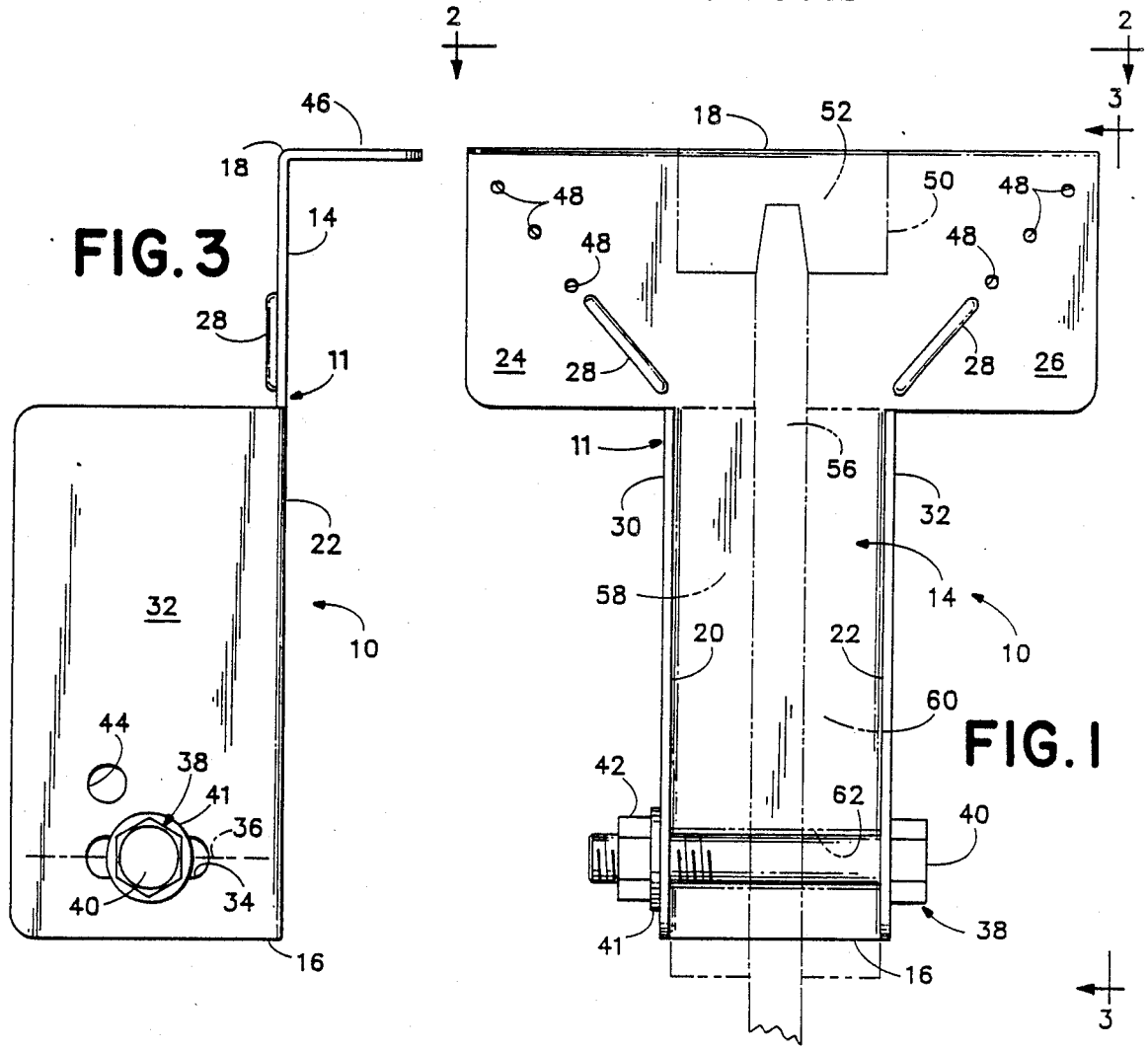

JOIST HANGER

BACKGROUND OF THE INVENTION

This invention relates to joists, and specifically to a hanger which supports an I-beam joist.

A great variety of metallic hangers are known which are used to secure wooden structural members to one another. The hangers generally include a lip or tab which rests on top of a support and some type of structure for connecting the tab to a joist. In some instances, a saddle arrangement is provided where a transverse support extends across the bottom of the joist being supported. Other forms of hangers rely on fasteners, such as nails, to retain the joist in position relative to the hanger and the support element.

One of the drawbacks with existing hangers is their reliance on fasteners such as nails to secure the joist in the hanger. The driving of a nail into a piece of wood is a stress-inducing event which may ultimately decrease the life expectancy of the structural element. Another problem associated with known hangers relates to the positioning of joists relative to supports and hangers. In some instances, the hanger may be improperly positioned on the joist or beam, resulting in misalignment of the two elements. One form of device which attempts to overcome this alignment problem is disclosed in U.S. Pat. No. 4,411,548 to Tschan. In the Tschan patent, a base or seat is provided to support the bottom of the joist while a top flange is provided to retain the hanger and joist on the support. A drawback with the Tschan joist hanger, and with many other conventional systems, is that a different size hanger must be used for each size of joist, resulting in the requirement to stock a great variety of hanger sizes.

A problem with some other prior art hangers is that the hanger is as long as the beam is deep, thus dramatically increasing the cost of the hanger system. Conventional hanger systems may also involve a different type of hanger at the top and bottom of the beam if the beam or joist is connected at a sloped angle; that is, if the upper portion of the beam is connected using a bracket defining an acute angle, a bracket defining a corresponding obtuse angle must be used at the bottom. Yet another drawback with existing systems is that many hangers do little to prevent buckling of the web which extends between the chords of an I-beam.

It is therefore an object of the present invention to overcome the drawbacks and limitations of the prior art proposals. More specifically, the invention has the following objects:

(1) to provide a hanger which may be used with I-beams of virtually any depth or slope;

(2) to develop a hanger which may be used with conventional I-beams by adding blocks to the webs thereof;

(3) the provision of a hanger which allows some lateral adjustment of an I-beam relative to a support for the beam;

(4) to provide a hanger which is self indexing with the top of the beam and which therefore indexes the top of the beam to a support;

(5) to develop a hanger which is easily and inexpensively fabricated and which has a high degree of structural integrity; and (6) the provision of an I-beam joist system which is stronger than existing systems but which can be easily assembled by workers having little expertise or training, and without having to use special equipment.

SUMMARY OF THE INVENTION

The glued-block ledger hanger of the invention is intended to support a wooden I-beam joist on a support. A block is secured to the web of the I-beam joist at the ends thereof intermediate the top and bottom chords. A bore is formed in the block and web, and extends therethrough at a predetermined position. The hanger includes a top tab and an end plate, wherein the end plate extends the height of the hanger. The top tab is constructed to extend over the top of a support. A pair of opposed flanges extend outward from the end plate and are spaced apart to snugly receive the web of the joist with the block secured thereto. Each of the flanges includes an opening therein. When the opening is aligned with the bore, the top tab of the hanger is in alignment with the top chord of the joist. A connector is provided and extends through the bore and the opening, thereby fastening the joist to the hanger. In the preferred embodiment the opening is in the form of a lengthwise slot which allows a predetermined amount of endwise adjustment in the position of the bore relative to the hanger.

Another aspect of the invention is a wood I-beam joist system having one of the aforedescribed hangers at each end.

These and other objects and advantages of the invention will become more fully apparent as the description which follows is read in conjunction with the drawings.

BRIEF DESCRIPTION OF THE DRAWINGS

FIG. 1, is a front elevation view of a first embodiment of the present invention.

FIG. 2 is a top plan view of the embodiment of FIG. 1 taken generally along the line 2—2 of FIG. 1.

FIG. 3 is a right side elevation view of the embodiment of FIG. 1 taken generally along the line 3—3 of FIG. 1.

DETAILED DESCRIPTION OF THE PREFERRED EMBODIMENT

Figure 4:
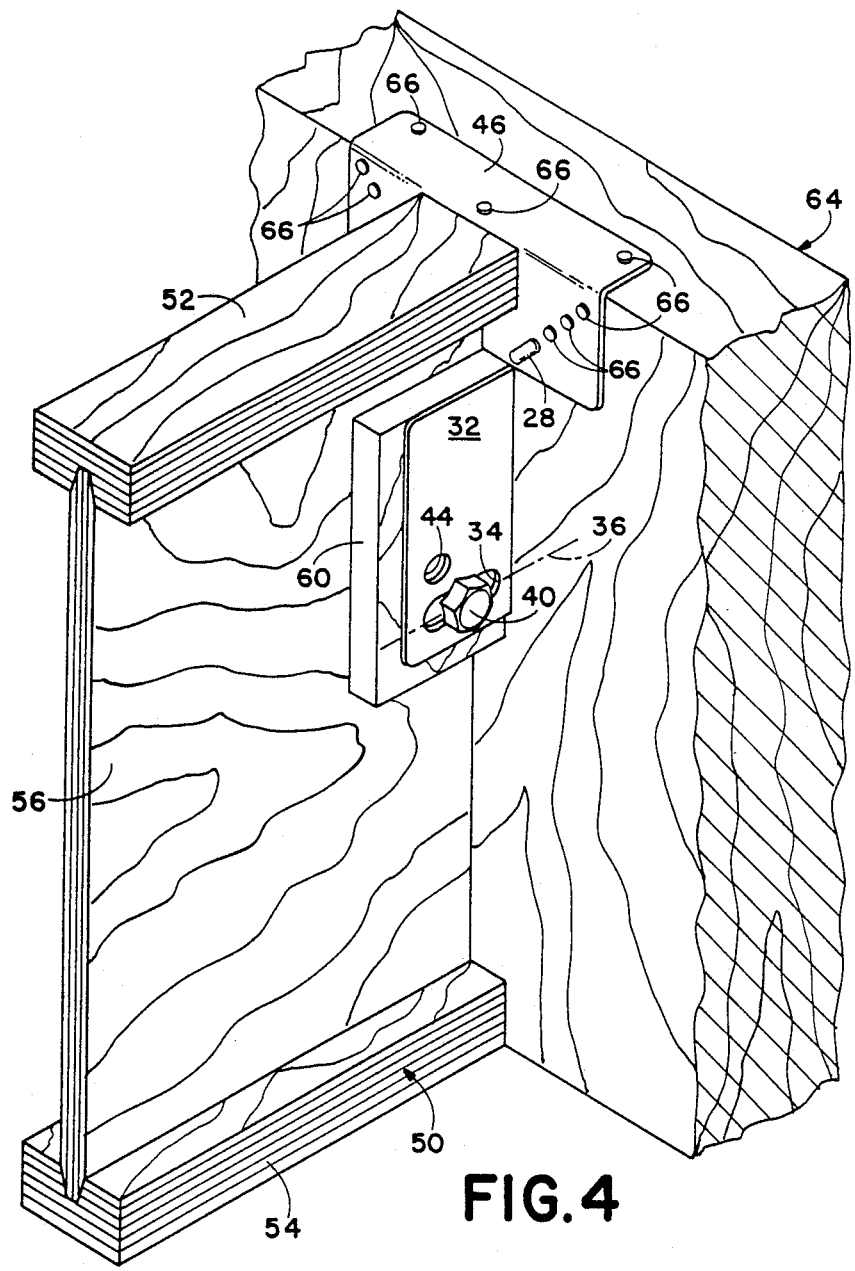
FIG. 4 is an environmental, perspective view of the embodiment of FIG. 1, showing the hanger holding a joist on a support.
Figure 7:
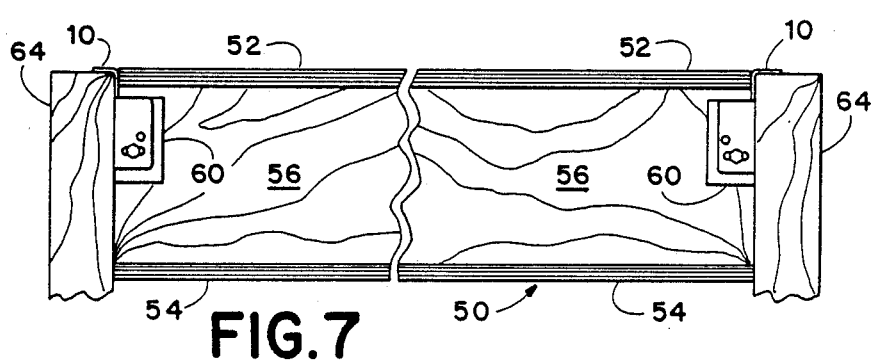
FIG. 7 is a side elevation, fragmentary view of the first embodiment showing hangers mounted to each end of an I-beam.

Turning now to the drawings, and initially to FIGS. 1-3, a glued-block hanger constructed according to the invention is shown generally at 10. Hanger 10 includes a generally vertically disposed hanger frame 11, with an end plate 14 which extends the full height of the hanger and has a bottom edge 16 and a top edge 18. End plate 14 has parallel, spaced apart sides 20, 22 which extend from bottom edge 16 upward to top edge 18.

Hanger frame 11 also includes wings 24, 26 which extend outward from end plate 14 along the upper lengths of edges 20, 22, respectively. In the preferred embodiment, wings 24, 26 are co-planar With the upper region of end plate 14. A rib 28 is formed in each wing to provide additional stiffness to the hanger.

Flanges 30, 32 extend outward from end plate 14 along the lower portion of sides 20, 22, respectively. The flanges are spaced from one another by a predetermined distance which allows for a snug fit for the joist which will be received therein. Each flange 30, 32 has a transverse slot 34 formed therein. The slot is elongate and has a major axis 36 along the length thereof which extends, in the preferred embodiment, substantially perpendicular to end plate 14. Slot 34 is sized to receive a connector 38, which in the preferred embodiment, takes the form of a bolt 40, a washer 41 and a nut 42 which is used to secure hanger 10 to a joist.

In the preferred embodiment, a circular hole 44 is formed in each flange 30, 32. Hole 44 is sized to also receive connector 38 and is used, if required, for on-site joining of hanger 10 with a joist.

A top tab 46 extends substantially normal to end plate 14 along top edge 18, and, in the preferred embodiment, extends along the width of wings 24, 26. Tab 46 is formed normal to end plate 14 in the direction opposite that of flanges 30, 32. A set of bores 48 are formed in top tab 46 and wings 24, 26 to receive fasteners, which are generally in the form of nails, which will secure hanger 10 to a support.

As shown best in FIG. 4, hanger 10 is shown with an I-beam joist 50 secured thereto. Joist 50 includes a top chord 52, a bottom chord 54, and a web 56 which extends between the top and bottom chords. As depicted herein, joist 50 is formed of laminated veneer lumber (LVL) with top and bottom chords having grooves formed therein to receive a beveled edge of web 56. However, it should be understood that hanger 10 can be used effectively with an I-beam fabricated of plank chords rather than LVL.

In any event, a pair of blocks 58, 60 are secured on each side of web 56, as by gluing and/or stapling or nailing, to provide additional thickness to the web at either end thereof. Blocks 58, 60 may be formed of ⅞" plywood or, in some instances, may be formed of two pieces of ⅜" plywood which are glued together prior to cutting. The blocks are normally spaced below upper chord 52 a distance which is slightly greater than the depth of chord 52 so that the I-beam can be nested into one another prior to installation. Web 56 may have a thickness of between ⅜" and 1½", depending upon the loads which are being supported by the structure.

Blocks 58, 60 and web 56 have a bore 62 formed therein at a predetermined location, which location will align with slots 34 on flanges 30, 32 when the upper surface of chord 52 is aligned with the upper surface of top tab 46. Such arrangement provides that the upper surface of chord 52 will be in planar alignment with the upper surface of hanger 10.

In the preferred embodiment, hanger 10 is formed of sheet metal which is approximately 3/16 inch thick, although the sheet metal may alternatively be ⅛ inch thick. Top tab 46 has a depth of 2.25 inch which provides adequate support for joist 50 to achieve, in spans up to 40 feet, a 6000 pound rating.

Hanger 12 is constructed with an overall depth of 11" and may be used to secure I-beam joist with web heights of over 30". Flanges 30, 32 are spaced apart to snugly receive the web and blocks glued on either side of the web therein. Under normal circumstances, blocks 58, 60 are applied to joist 50 during fabrication of the joist. Bore 62 is also formed during the manufacturing process.

ASSEMBLY OF THE PREFERRED EMBODIMENT

Once the joists arrive at the construction site, the hangers are loosely secured to the joists with connectors 38. The positioning of bore 62 is such that if hanger 10 is applied to the wrong side of the joist, i.e. with top tab 46 aligned with bottom chord 54, slot 34 will not align with bore 62. If the hanger is secured to the joist with bore 62 and slot 34 aligned and the hanger is on the wrong way, it will not align with either the top or bottom chord.

Once the hangers are loosely secured to the joists, the joist may be lifted into position on support 64. The joist/hanger combination is properly positioned on support 64, and nails 66 are driven through bores 48 to secure the hanger to the support. After the hanger is secured to the support, connector 38 is tightened, thereby securing the joist in place. The arrangement of slot 34 provides for a predetermined amount of lateral adjustment in the position of hanger 10 relative to bore 62, and therefore to joist 50. In the final installation, a gap of as much as ½" may be allowed between the ends of joist 50 and the edge of support 64.

As previously noted, the driving of nails into a joist produces a stressful condition in the joist. Additionally, the nails which are used typically have a diameter of about ⅛". The provision of a single bolt, which in the preferred embodiment has a diameter of ¾ inch, does not produce the type of stress on the joist which is produced by nailing the hanger to the joist, and, the bore through which the bores passes is reinforced on either side of the web by blocks 58, 60.

The provision of slot 34, which has a length of 2 inches in the preferred embodiment, allows an adjustment of 1¼ inch of hanger 10 and the associated I-beam relative to joist 50. The attachment of the hanger to the support with nails provides a tight fit between the hanger and the support. A gap of up to ½" inch between the end of the joist and the side of the support is acceptable.

If it is necessary to trim the end of a joist on site, a trim of up to 1¼ inch may be made without having to reposition the connector. If it is necessary to trim a greater amount from the end of the joist, the joist may be trimmed, and a new bore made, either in alignment with slot 34 or with hole 44.

In the event that the bore in the joist does not properly lineup with slot 34, a second bore may be formed in alignment with hole 44 and connector 38 installed in the second bore and hole 44.

Quantitative tests performed on I-beam joists, having a 40 foot length and a 30 inch web resulted in failure of the web/chord joint, or failure of the web material, at loads in excess of three times the 6000 pound rating. The hangers were undamaged. The bolts were bent to a slight degree and the bore was somewhat elongate. However, the failure of the joist occurred in the middle of its span and not at the ends.

ALTERNATE EMBODIMENT

Figure 5:
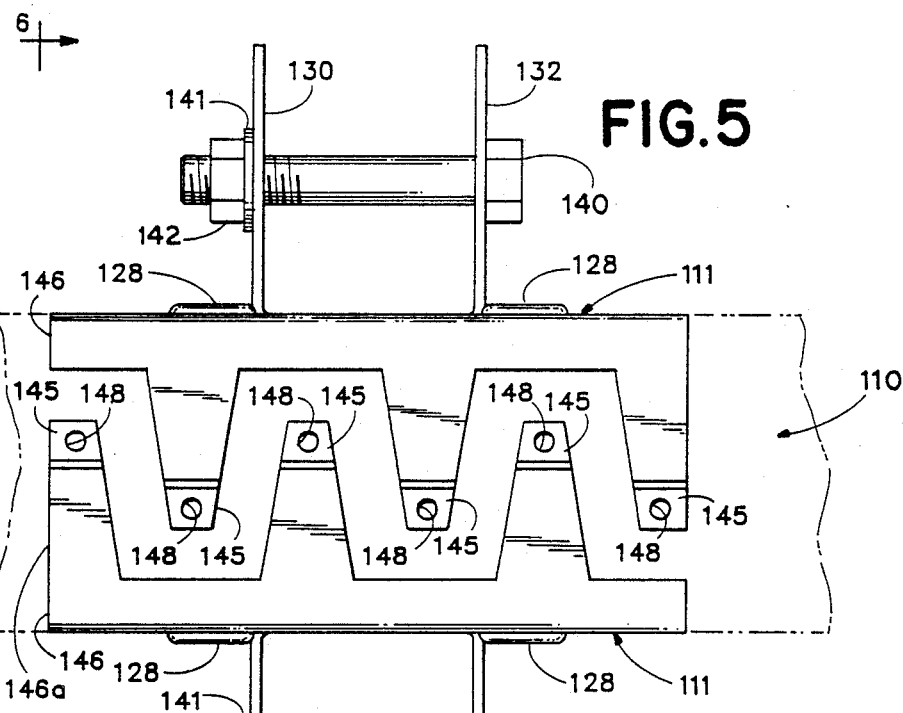
FIG. 5 is a top plan view of a second embodiment of the invention.
Figure 6:
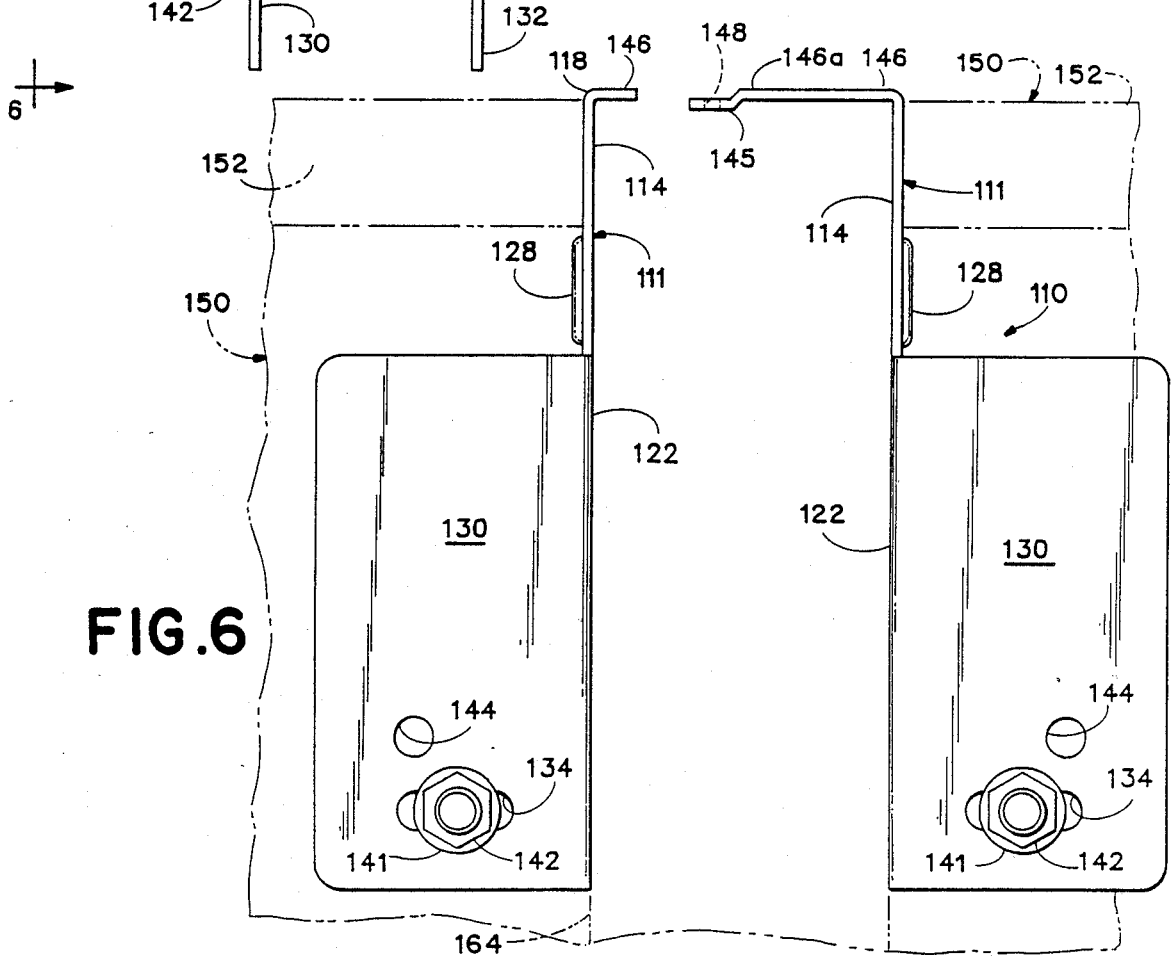
FIG. 6 is a side elevation view of the embodiment of FIG. 5, as taken along line 6—6 of FIG. 5, and showing a pair of I-beams and a support in phantom.

FIGS. 5 and 6 depict an alternate form of the hanger, which is identified generally with the numeral 110. Two I-beams 150 with their upper chords 152 are shown in phantom in FIG. 6, along with a horizontal support 64. In most respects this alternate embodiment is identical to hanger 10 depicted in FIGS. 1–4; however, it is different in that instead of having a generally rectangular top tab 46, hanger 110 and its hanger frame 111 has a top tab 146 comprised of as plurality of extensions or interlocking fingers 146a. Each of the fingers 146a includes an offset portion 145 adjacent the ends thereof which is to be countersunk into the support. The other components of hanger 110 correspond to that of hanger 10, so have been depicted and identified with corresponding numerals in the 100 series.

Hanger 110 is useful in applications where support 64 has joists 152 mounted to each side, especially where the support is of a dimension which will not provide sufficient room for abutting top tabs 46. Another advantage of hanger 110 is that with the fingers 146a extending across the support, past the fingers of the opposing hanger 110, cross grain tension stresses are eliminated. This is a significant advantage because wood is inherently weak in resisting cross grain stresses.

This and other modifications of the present invention may be made without departing from the spirit and scope of the present invention. It should be appreciated that such variations and modifications are intended to be covered by the following claims which follow.

What I claim is:

1. A gluéd-block hanger system for supporting an I-beam joist on a support, comprising:
   a block which is secured to the web of an I-beam joist at the ends thereof intermediate the top and bottom chords, said block and the web having a bore extending therethrough at a predetermined position;
   a hanger including a top tab and an end plate, said top tab being constructed and arranged to extend over the top of a support with said end plate extending down a side of the support, and a pair of opposed, spaced apart flanges extending outward from said end plate, said flanges being spaced apart to snugly receive the joist web and block therein, each of said flanges further including an opening formed therein, said opening being aligned with said bore when the top chord of the joist is aligned with said top tab; and
   a connector which extends through said bore and said opening, thereby fastening the joist on the hanger.

2. The hanger of claim 1 wherein said flanges each include a circular hole therein for on-site repositioning of said connector.

3. The hanger of claim 2 wherein said circular hole is located on said flange above said opening.

4. The hanger of claim 1 wherein said opening comprises a slot which allows a predetermined amount of endwise adjustment in the position of said bore relative to said flange.

5. The hanger of claim 1 wherein said top tab is comprised of a plurality of extensions terminating in ends, each said extension having a hole adjacent the end thereof.

6. The hanger of claim 5 wherein each of said extensions has a downwardly offset portion adjacent the end thereof.

7. The hanger of claim 6 wherein said circular hole is located in said flanges above said slot.

8. A hanger for supporting an I-beam joist on a support, the I-beam having a block glued to the web thereof on either side of the web, the block and the web having a bore therethrough at a predetermined location, the hanger comprising:
   a vertically disposed hanger frame having a predetermined height, a end plate extending the height of said frame, a top tab extending substantially normal to said end plate at the top thereof and a pair of opposed flanges extending normal, in a direction opposite that of said top tab, to said end plate along the lower edges thereof, each of said flanges further including a transverse slot, having a major axis extending normal to said end plate, formed therein, said slot being aligned with said bore when the top chord of the joist is aligned with said top tab, said slot allowing for a predetermined amount of endwise adjustment in the position of said bore relative to said flanges; and
   a connector which extends through said bore and said slot, thereby fastening the joist on the hanger.

9. The hanger of claim 8 wherein said flanges each includes a circular hole therein for on-site repositioning of said connector.

10. The hanger of claim 8 wherein said top tab is comprised of a plurality of extensions terminating in ends, each said extension having a hole adjacent the end thereof.

11. The hanger of claim 10 wherein said top tab is comprised of a plurality of extensions terminating in ends, each said extension having a hole adjacent the end thereof.

12. An I-beam joist system, comprising:
   an I-beam having a pair of wood chords with a web extending therebetween;
   blocks fastened to each side of said web adjacent each end thereof, said blocks and web defining a bore extending therethrough normal to said I-beam;
   a pair of hangers, one of which is fastened to each end of said I-beam, each of said hangers including a vertically disposed hanger frame having a predetermined height,
   a planar end plate extending the height of said hanger, with a pair of end-plate wings extending outward from said end plate in the same plane thereof,
   a top tab extending substantially normal to the plane of said end plate at the top edge thereof, said top tab extending laterally along the width of said end plate and said end-plate wings, and
   a pair of opposed flanges extending normal, in a direction opposite that of said top tab, to said end plate along the lower edges thereof, each of said flanges further including an opening which is aligned with said bore when the top chord of the joist is aligned with said top tab; and
   a connector extending through said bore and said opening, thereby fastening said I-beam to said hanger.

13. The system of claim 12, wherein said opening comprises a lengthwise slot, having a major axis extending normal to said end plate to allow a predetermined amount of lateral adjustment in the position of said bore relative to said flanges.

14. The system of claim 13, further comprising a circular hole located in said flanges above said slot.

15. The system of claim 14, wherein said blocks are fastened to said web by adhesive.

16. The system of claim 12 wherein said top tab is comprised of a plurality of extensions terminating in ends, each said extension having a hole adjacent the end thereof.

17. The system of claim 12, further comprising:
   a second said I-beam having another two pairs of said blocks and another pair of said hangers fastened thereto; and a support extending generally horizontally and normal to said I-beams and mounted thereto with top tabs resting on said support, said I-beams extending in aligned and parallel relation from each side of said support, such that said top tabs of said hangers of said I-beams mounted to said support are facing each other.

18. The system of claim 17, wherein each of said top tabs is comprised of a plurality of extensions terminating in ends, each said extension having a hole adjacent the end thereof.

19. The system of claim 18, wherein each of the said top tab extensions has a downwardly offset portion adjacent the end thereof.

20. The system of claim 18, wherein said extensions of said top tabs of said hangers which are facing each other are laterally offset with respect to the extensions of the other said top tab.

* * * * *